US008205224B2

(12) United States Patent
Kim

(10) Patent No.: US 8,205,224 B2
(45) Date of Patent: Jun. 19, 2012

(54) IMAGE SIGNAL PROCESSING APPARATUS AND CONTROL METHOD FOR SELECTING A RATING SYSTEM THEREOF

(75) Inventor: Kwang-won Kim, Seocho-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1529 days.

(21) Appl. No.: 11/704,945

(22) Filed: Feb. 12, 2007

(65) Prior Publication Data

US 2007/0220541 A1 Sep. 20, 2007

(30) Foreign Application Priority Data

Mar. 3, 2006 (KR) .................. 10-2006-0020511

(51) Int. Cl.
*H04N 7/16* (2011.01)
(52) U.S. Cl. .......................................... 725/28
(58) Field of Classification Search .................. None
See application file for complete search history.

(56) References Cited

U.S. PATENT DOCUMENTS

| | | | | | |
|---|---|---|---|---|---|
| 5,583,576 | A * | 12/1996 | Perlman et al. | ............... | 725/28 |
| 5,828,402 | A * | 10/1998 | Collings | .................. | 725/28 |
| 5,912,696 | A * | 6/1999 | Buehl | ............... | 725/28 |
| 5,995,133 | A * | 11/1999 | Kim | .................. | 725/28 |
| 6,449,766 | B1 * | 9/2002 | Fleming | ............ | 725/28 |
| 6,922,843 | B1 * | 7/2005 | Herrington et al. | ............. | 725/30 |
| 7,089,576 | B1 * | 8/2006 | Lynch | .............. | 725/25 |
| 7,472,424 | B2 * | 12/2008 | Evans et al. | ..................... | 726/27 |
| 7,950,032 | B1 * | 5/2011 | Lynch | .............. | 725/28 |
| 2003/0023969 | A1 * | 1/2003 | Jeong | .............. | 725/28 |
| 2003/0115592 | A1 * | 6/2003 | Johnson | ............ | 725/28 |
| 2003/0122962 | A1 * | 7/2003 | Kim | .............. | 348/468 |
| 2004/0133923 | A1 * | 7/2004 | Watson et al. | .............. | 725/134 |
| 2005/0204380 | A1 * | 9/2005 | Lee | .................. | 725/25 |
| 2007/0204287 | A1 * | 8/2007 | Conradt et al. | ............. | 725/28 |

FOREIGN PATENT DOCUMENTS

| | | | |
|---|---|---|---|
| KR | 10-2002-0072135 A | | 9/2002 |
| KR | 10-2003-0091588 A | | 12/2003 |
| WO | WO 03/055215 A1 | | 7/2003 |

* cited by examiner

*Primary Examiner* — Brian Pendleton
*Assistant Examiner* — Jonathan V Lewis
(74) *Attorney, Agent, or Firm* — Sughrue Mion, PLLC

(57) ABSTRACT

An image signal processing apparatus includes: a signal receiving part receiving an image signal including rating system information of an image; a control part causing a UI (user interface) to be displayed to select whether to use the rating system based on the rating system information; an OSD (on screen display) processing part generating the UI under control of the control part; and a first information storing part storing the rating system information under control of the control part if the rating system information is selected to be used.

18 Claims, 2 Drawing Sheets

IMAGE SIGNAL PROCESSING APPARATUS AND CONTROL METHOD FOR SELECTING A RATING SYSTEM THEREOF

CROSS-REFERENCE TO RELATED APPLICATIONS

This application claims priority from Korean Patent Application No. 2006-0020511, filed on Mar. 3, 2006, in the Korean Intellectual Property Office, the disclosure of which is incorporated herein by reference.

BACKGROUND OF THE INVENTION

1. Field of the Invention

The present invention relates to an image signal processing apparatus and a control method thereof, and more particularly, to an image signal processing apparatus for allowing a user to select a desired rating system, and a control method thereof.

2. Description of the Related Art

Generally, an image signal processing apparatus such as a set-top box, a TV, etc. receives an image signal such as a terrestrial TV broadcasting, a cable TV broadcasting, etc., and processes the received image signal, and displays an image based on the processed image signal. There are various contents in the TV broadcastings, and some contents need to be prevented from being watched by some viewers. For example, contents including violence, sex or the like should be restricted for children.

Thus, a broadcasting program or a channel (hereinafter referred to as a program) is rated according to contents thereof by means of a rating system such as "TV parental guidelines system" and "MPAA film rating system" of the United States of America, "Canadian TV classification system" of Canada, etc.

The image signal includes information related to the rating system (hereinafter referred to as "rating system information"). For example, in a PSIP (program and system information protocol) of an ATSC (advanced television systems committee) standard, rating system information is included in a RRT (rating region table).

A user inputs rating setting information related to a predetermined rating system to the image signal processing apparatus. For example, in the TV parental guidelines system, a user may input "TV-14" for permitting a viewer of over 14 year to watch.

Also, the image signal includes information related to rating of a program thereof (hereinafter referred to as "rating information"). For example, in the PSIP of the ATSC standard, rating information is included in a "content advisory descriptor."

Here, the image signal processing apparatus extracts rating information from the image signal. Then, if a program of the image signal has a rating higher than "TV-14", the image signal processing apparatus suitably processes the image signal so that a viewer can not watch the program in a normal fashion. For performing this function, the image signal processing part may include a processing unit such as a V-chip (violence chip).

However, the image signal processing apparatus is typically designed to correspond to one or two rating systems of a region. Also, the rating system has some defined rating references such as age and so on.

In recent years contents of the broadcastings have been increasing rapidly. Accordingly, the rating references need to be more diversified according to interests and tastes of users. For example, an excessive comedy or an extreme tragedy should be restricted to some patients. Thus, the image signal processing apparatus needs to provide a user with a chance to select a rating system to his/her hobby or taste.

Also, the kind of the rating system is expected to be diversified to correspond to various ratings. Thus, it is inefficient for the image signal processing apparatus to store all information related to a large number of rating systems.

SUMMARY OF THE INVENTION

Accordingly, it is an aspect of the present invention to provide an image signal processing apparatus allowing a user to select a rating system to his/her taste and efficiently store the rating system information, and a control method therefor.

The foregoing and/or other aspects of the present invention can be achieved by providing an image signal processing apparatus comprising: a signal receiving part receiving an image signal including rating system information of an image; a control part causing a UI (user interface) to be displayed to select whether to use a rating system which is based on the received rating system information; an OSD (on screen display) processing part generating the UI under control of the control part; and a first information storing part storing the rating system information under control of the control part if the rating system information is selected to be used.

According to the embodiment of the present invention, the image signal processing apparatus further comprises a display part displaying the UI under control of the control part.

According to the embodiment of the present invention, the image signal further includes image information, and rating information of the image corresponding to the rating system information, and the control part restricts the display part from displaying an image based on the image information according to a rating selected by a user, the stored rating system information, and the received rating information.

According to the embodiment of the present invention, the control part controls the OSD processing part to display the UI if rating system information received by the signal receiving part is different from the rating system information stored in the first information storing part.

According to the embodiment of the present invention, the image signal processing apparatus further comprises a second information storing part storing the rating system information received by the signal receiving part, wherein the control part controls the OSD processing part to display the UI based on the rating system information stored in the second information storing part, and deletes the rating system information from the second information storing part if a user selects not to use the rating system information.

According to the embodiment of the present invention, the rating system information and the rating information are respectively included in an RRT (rating region table) and a content advisory descriptor based on a PSIP (program and system information protocol) of an ATSC (advanced television systems committee) standard.

The foregoing and/or other aspects of the present invention can be achieved by providing a control method of an image signal processing apparatus comprising a first information storing part, comprising: receiving an image signal including rating system information of an image; displaying a UI to allow a user to select whether to use a rating system which is based on the received rating system information; receiving a selection from the user to indicate which is based on the received rating system information; and storing the rating system information in the first information storing part according to the selection of the user.

According to the embodiment of the present invention, the image signal further includes image information, and rating information of the image corresponding to the rating system information, the control method further comprises: receiving a rating selection from the user; and restricting displaying the image based on the image information according to the rating selected by the user, the stored rating system information, and the received rating information.

According to the embodiment of the present invention, the displaying the UI comprises: determining whether the received rating system information is different from the rating system information stored in the first information storing part; and displaying the UI if the received rating system information is different from the stored rating system information.

According to the embodiment of the present invention, the image signal processing apparatus further comprises a second information storing part, the control method further comprises: storing the received rating system information in the second information storing part; and deleting the rating system information from the second information storing part if the user selects not to use the rating system information, wherein the displaying the UI further comprises displaying the UI based on the rating system information stored in the second information storing part.

According to the embodiment of the present invention, the rating system information and the rating information are respectively included in an RRT and a content advisory descriptor based on a PSIP of an ATSC standard.

The foregoing and/or other aspects of the present invention can be achieved by providing a control method of an audio and/or an image signal processing apparatus comprising a first information storing part, comprising: receiving the audio and/or image signal including rating system information; determining whether the received rating system information is new; displaying a UI to allow a user to select whether to use a rating system based on the received rating system information if it is determined that the received rating system information is new; receiving a selection from the user to indicate whether to use the rating system based on the received rating system information; and storing the rating system information in the first information storing part according to the selection of the user.

According to the embodiment of the present invention, the control method further comprises the step of: receiving a rating selection from the user; and restricting at least a portion of the audio and/or image signal depending upon the rating selection, rating system and a rating information of the received audio and/or image signal.

According to the embodiment of the present invention, the received audio and/or image signal includes information indicating the portions of the audio and/or image signal that corresponds to the rating information.

According to the embodiment of the present invention, the control method further comprises: restricting a portion of the received audio and/or image signal from being presented to the user in response to the information indicating the portions of the audio and/or image signal that corresponds to the rating information.

According to the embodiment of the present invention, the received signal is an audio signal.

According to the embodiment of the present invention, the audio signal is a radio broadcast.

According to the embodiment of the present invention, the received signal is a digital broadcast television signal.

According to the embodiment of the present invention, wherein the digital broadcast is an IPTV broadcast.

According to the embodiment of the present invention, the received signal is an ATSC broadcast signal.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

Figure 1:
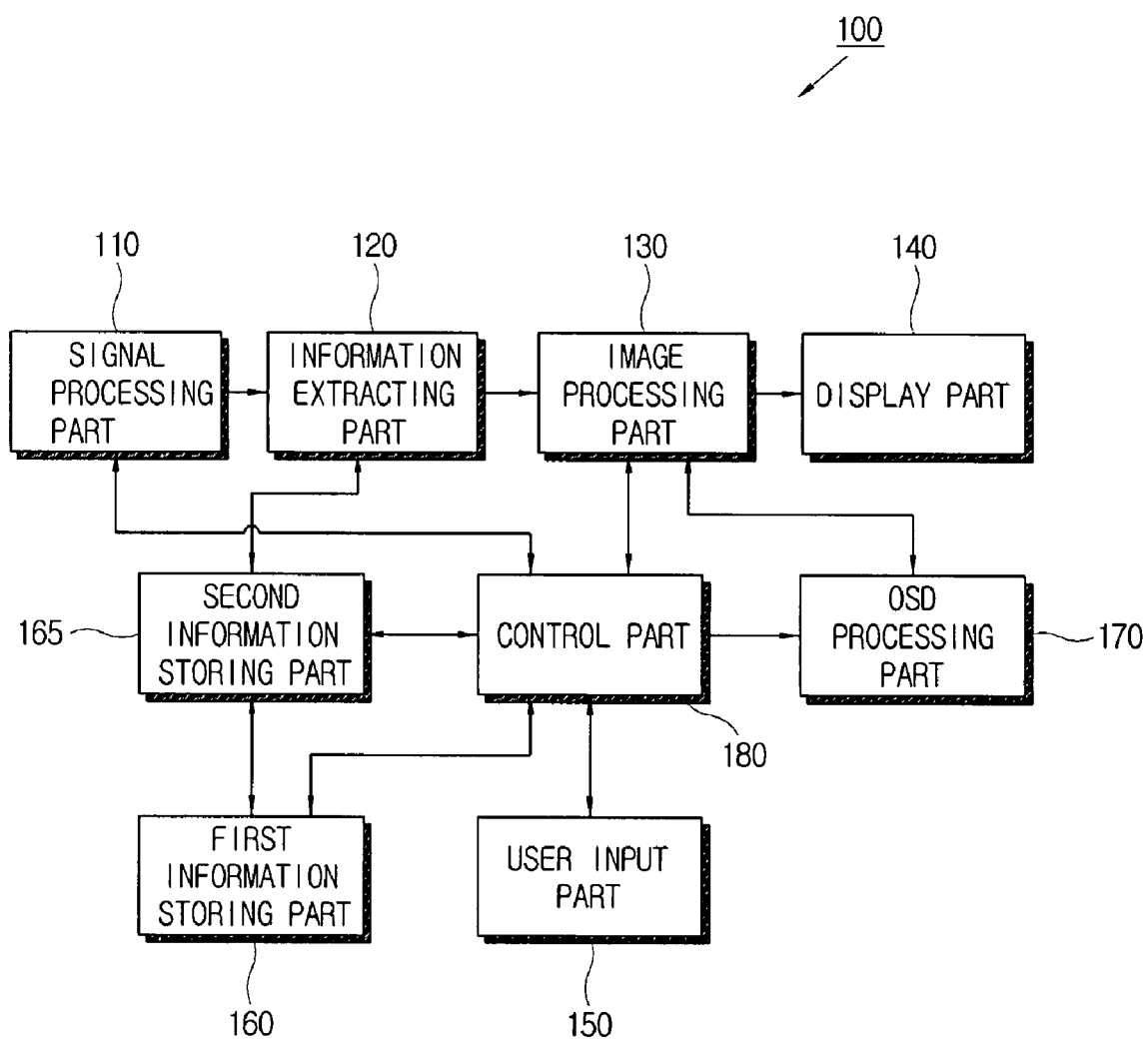
FIG. 1 is a block diagram illustrating an image signal processing apparatus according to an embodiment of the present invention.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

As shown in FIG. 1, an image signal processing apparatus 100 receives an image signal including image information from a broadcasting station, processes the received image signal, and displays an image based on the image information of the processed image signal.

The image signal processing apparatus 100 may be provided as a digital TV, a set-top box, DMB device (Digital Mobile Broadcast), IPTV or any other types of broadcast receiver for receiving and processing an image signal from a digital TV broadcasting. Alternately, the present invention may be applicable to devices for receiving audio programs (e.g. a radio broadcast) that may have undesirable content. The image signal referred to in this invention may be a still picture signal as well as a video signal. Thus, the signal to be processed in the present invention may any one or a combination of an audio signal, still picture signal and video signal. The image signal processing apparatus 100 may receive and process the image signal based on an ATSC (advanced television systems committee) standard.

The image signal includes image information about an image or video of a program. For example, an image signal may be a broadcasting signal including video data, audio data, information data, etc. based on the ATSC standard. Here, the video data is one example of the image information. The image signal includes rating system information about a predetermined rating system, and rating information of a program. The rating system information and the rating information are respectively included in an RRT (rating region table) and a "content advisory descriptor" based on a PSIP (program and system information protocol) of the ATSC standard. The rating system include "TV parental guidelines system", "MPAA film rating system", etc.

As shown in FIG. 1, the image signal processing apparatus 100 includes a signal receiving part 110, an information extracting part 120, an image processing part 130, a display part 140, a user input part 150, a first information storing part 160, a second information storing part 165, an OSD processing part 170 and a control part 180. In the case that the image signal processing apparatus 100 is provided as a set-top box, the display part 140 may be omitted.

The signal receiving part 110 receives an image signal of a channel selected by a user by tuning to a frequency corresponding to the selected channel under control of the control part 180.

The information extracting part 120 extracts image information, rating system information and rating information from the image signal received through the signal receiving part 110. Also, the information extracting part 120 performs demodulation, A/D conversion, etc. for the received image signal to obtain an MPEG-2 TS (transport stream). Also, the information extracting part 120 decodes the obtained MPEG-2 TS according to an MPEG-2 standard. The information extracting part 120 performs a process related to an SI (system information) based on the PSIP of the ATSC standard.

The image processing part 130 processes the image information obtained through the information extracting part 120 so that the display part 140 displays an image. The image processing part 130 may perform an image enhancement operation for enhancing an image quality for the image signal, and a scaling operation for adjusting an image resolution so that an image has a suitable size. Also, the image processing part 130 may perform a de-interlacing operation for an interlaced image signal.

The display part 140 receives the processed image signal from the image processing part 130 and displays an image according to the processed image signal. The display part 140 displays a UI (user interface) allowing a user to select the rating system information based on the rating information. The display part 140 may be provided as a CRT (cathode ray tube), an LCD (liquid crystal display), a PDP (plasma display panel), a DLP (digital light processing), an OLED (organic light emitting diode), an SED (surface-conduction electron-emitter display), an FED (field emission display), etc.

The user input part 150 receives a user's selection related to use of the rating system information, and supplies it to the control part 180. Also, the user input part 150 receives a rating selection from a user, and supplies it to the control part 180. The user input part 150 may be provided as an operating panel (not shown), a remote controller (not shown) or the like.

The first information storing part 160 continuously stores the rating system information under control of the control part 180. The first information storing part 160 may be embodied by various different memory devices including an EEPROM (electrically erasable and programmable read only memory) or the like. The second information storing part 165 temporarily stores the received rating system information. The display part 140 displays the UI based on the rating system information stored in the second information storing part 165. The second information storing part 165 may be embodied by a various different memory devices such as a RAM (random access memory) or the like.

The OSD processing part 170 processes OSD (on screen display) information of the UI displayed by the display part 140 under control of the control part 180. For example, the OSD information includes a guidance message, a set up window, etc., related to the rating system, to be displayed when a user selects a rating system. The OSD processing part 170 processes the OSD information based on the rating system information stored in the second information storing part 165.

The control part 180 controls the signal receiving part 110, the information extracting part 120, the image processing part 130, the first information storing part 160, the second information storing part 165, and the OSD processing part 170 according to instructions inputted by the user through the user inputting part 150.

In the case that rating system information being received is different from the rating system information already stored in the first information storing part 160 (referring to as "existing rating system information"), the rating system information being received is determined to be a "new rating system information." If rating system information being received is determined as a new rating system information, the control part 180 controls the OSD processing part 170 and the display part 140 so that a UI is displayed to allow the user to select whether to use the new rating system information or not. The control part 180 may determine whether rating system information of a program being received is new rating system information or not based on the RRT of the SI.

In the case that rating system information being received is new rating system information, it is preferable but not necessary for the control part 180 to control the display part so that a guidance message about the new rating system information is displayed based on the RRT. The control part 180 confirms a user's selection about whether to use the new rating system information or not, and stores the new rating system information in the first information storing part 160 according to a result of the confirmation. In the case that a user selects not to use the rating system information received, the control part 180 may delete the received rating system information from the second information storing part 165. In the case that the new rating system information is the same as existing rating system information, the control part 180 may replace the existing rating system information with the new rating system information, just in case the stored rating system information is corrupted; furthermore, the user may designate whether to replace the existing rating system.

Also, the control part 180 stores a user's rating selection inputted through the user inputting part 150 in the first information storing part 160. The control part 180 restricts displaying of an image based on the rating selection and the rating system information stored in the first information storing part 160, and rating information of a program being received. It is noted that the rating system information may be specific to individual programs; that is, each program may have its own rating system information. Similarly, each channel or broadcasting station (having number of different channels) or a broadcast network may have its own rating system information. For example, a particular broadcast station may have its own idea for implementing various different rating schemes. In any case, the rating system information may have various different scopes depending upon the particular situation. Furthermore, the blocking of the program may be performed in its entirety or only a portion of the program containing the undesired scene may be blocked. In order to block only a portion of a program, additional information for indicating the beginning and end location of the rated scene may be used or an information to allow jumping (blocking and waiting until the undesired scene has passed) within the program may be needed. In the case of the ATSC, the additional information may be included in the unused portion of the PSIP.

Hereafter, an operation of the image signal processing apparatus 100 will be described by referring to FIGS. 1 and 2.

Figure 2:
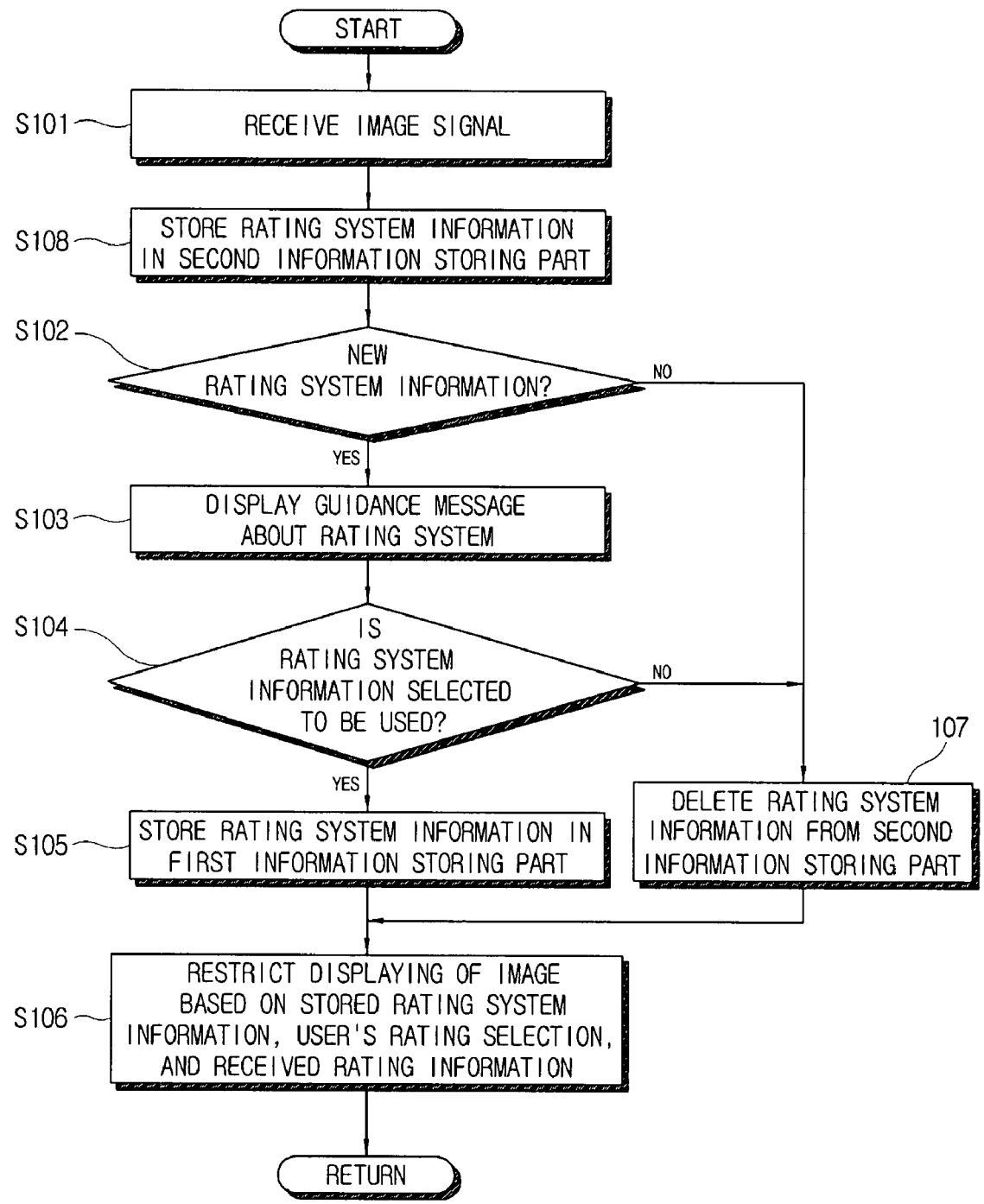
FIG. 2 is a flowchart illustrating an operation of the image signal processing apparatus in FIG. 1.

As shown in FIGS. 1 and 2, at first, a user selects a channel through the user input part 150, and the signal receiving part 110 receives an image signal of the selected channel under control of the control part 180 at operation S101. The control part 180 stores rating system information obtained from the received image signal in the second information storing part 165 at operation S108.

Then, the control part 180 determines whether the rating system information stored in the second information storing part 165 is new rating system information or not at operation S102. The control part 180 may determine the above by referring to an RRT of the received image signal. For example, the control part 180 may determine the above by comparing "version_number", "dimension_name_text( )", etc. of the RRT with those of existing rating system information already stored in the first information storing part 160. The control part 180 may determine that the rating system information being received is a new rating system information if the names are different or if the versions or contents are different even though the names are the same.

If the received rating system information is new, the control part 180 controls the OSD processing part 170 so that the display part 140 displays a UI including a guidance message, etc. about the received rating system at operation S103. For example, the control part 180 refers to "dimension_name_text( )", "rating_value_text( )", etc. to display a name, a rating value, etc. of the rating system.

Then, the control part 180 confirms if a user selects whether to use the rating system information or not through the user inputting part 150 at operation S104. If the user selects to use it, the control part 180 stores the rating system information to the first information storing part at operation S105.

In the case that the received rating system information is not new, or the user selects not to use the rating system information, the control part 180 may delete the rating system information stored in the second information storing part 165 at operation S107.

Then, the control part 180 restricts displaying of a program based on the rating system information stored in the first information storing part 160, a user's rating selection, and rating information of a program being received at operation 106.

The control part 180 may be embodied by a computer program running on a micro processor such as a CPU. Here, the control part 180 includes the CPU, a memory such as a hard disk, a ROM or the like storing the computer program.

As apparent from the above description, the present invention provides an image signal processing apparatus allowing a user to select a rating system and efficiently storing rating system information, and a control method thereof.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image signal processing apparatus comprising:
    a signal receiving part receiving an image signal including rating system information of an image;
    a control part comparing the received rating system information with current rating system information and causing a UI (user interface) to be displayed to notify that a new rating system information is received and to select whether to use the received rating system if the received rating system information is different from the current rating system information;
    an OSD (on screen display) processing part generating the UI under control of the control part; and
    a first information storing part storing the received rating system information under control of the control part if the received rating system information is selected to be used in place of the current rating system information.

2. The image signal processing apparatus according to claim 1, further comprising a display part displaying the UI under control of the control part.

3. The image signal processing apparatus according to claim 1, wherein the image signal further includes image information, and rating information of the image corresponding to the rating system information, and
    the control part restricts the display part from displaying an image based on the image information according to a rating selected by a user, the stored rating system information, and the received rating information.

4. The image signal processing apparatus according to claim 1, further comprising a second information storing part storing the rating system information received by the signal receiving part,
    wherein the control part controls the OSD processing part to display the UI based on the rating system information stored in the second information storing part, and deletes the rating system information from the second information storing part if a user selects not to use the rating system information.

5. The image signal processing apparatus according to claim 1, wherein the rating system information and the rating information are respectively included in an RRT (rating region table) and a content advisory descriptor based on a PSIP (program and system information protocol) of an ATSC (advanced television systems committee) standard.

6. A control method of an image signal processing apparatus comprising a first information storing part, comprising:
    receiving an image signal including rating system information of an image;
    comparing the received rating system information with current rating system information;
    displaying a UI to allow a user to be notified that a new rating system information is received and to select whether to use the received rating system if the received rating system information is different from the current rating system information;
    receiving a selection from the user to indicate whether to use the received rating system which is based on the received rating system information; and
    storing the received rating system information in the first information storing part if the received rating system information is selected to be used in place of the current rating system information.

7. The control method according to claim 6, wherein the image signal further includes image information, and rating information of the image corresponding to the rating system information, the control method further comprises:
    receiving a rating selection from the user; and
    restricting displaying the image based on the image information according to the rating selected by the user, the stored rating system information, and the received rating information.

8. The control method according to claim 6, wherein the image signal processing apparatus further comprises a second information storing part,
    the control method further comprises:
    storing the received rating system information in the second information storing part; and deleting the rating system information from the second information storing part if the user selects not to use the rating system information, wherein the displaying the UI further comprises displaying the UI based on the rating system information stored in the second information storing part.

9. The control method according to claim 6, wherein the rating system information and the rating information are respectively included in an RRT and a content advisory descriptor based on a PSIP of an ATSC standard.

10. A control method of an audio and/or an image signal processing apparatus comprising a first information storing part, comprising:

receiving the audio and/or image signal including rating system information;

determining whether the received rating system information is new;

displaying a UI to allow a user to be notified that a new rating system information is received and to select whether to use the received rating system based on the received rating system information if it is determined that the received rating system information is new;

receiving a selection from the user to indicate whether to use the rating system based on the received rating system information; and storing the received rating system information in the first information storing part if the received rating system information is selected to be used in place of the current rating system information.

11. The control method according to claim 10, further comprising the step of:

receiving a rating selection from the user; and restricting at least a portion of the audio and/or image signal depending upon the rating selection, rating system and a rating information of the received audio and/or image signal.

12. The control method according to claim 11, wherein the received audio and/or image signal includes information indicating the portions of the audio and/or image signal that corresponds to the rating information.

13. The control method according to claim 12, further comprising:

restricting a portion of the received audio and/or image signal from being presented to the user in response to the information indicating the portions of the audio and/or image signal that corresponds to the rating information.

14. The control method according to claim 10, wherein the received signal is an audio signal.

15. The control method according to claim 14, wherein the audio signal is a radio broadcast.

16. The control method according to claim 13, wherein the received signal is a digital broadcast television signal.

17. The control method according to claim 16, wherein the digital broadcast is an IPTV broadcast.

18. The control method according to claim 16, wherein the received signal is an ATSC broadcast signal.

* * * * *